United States Patent
Zeng et al.

(10) Patent No.: US 8,259,783 B2
(45) Date of Patent: Sep. 4, 2012

(54) METHOD OF DETERMINING AS TO WHETHER A RECEIVED SIGNAL INCLUDES AN INFORMATION SIGNAL

(75) Inventors: Yonghong Zeng, Singapore (SG); Ying-Chang Liang, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 560 days.

(21) Appl. No.: 12/513,545

(22) PCT Filed: Nov. 7, 2007

(86) PCT No.: PCT/SG2007/000382
§ 371 (c)(1),
(2), (4) Date: Dec. 22, 2009

(87) PCT Pub. No.: WO2008/057053
PCT Pub. Date: May 15, 2008

(65) Prior Publication Data
US 2010/0111235 A1 May 6, 2010

Related U.S. Application Data

(60) Provisional application No. 60/864,644, filed on Nov. 7, 2006.

(51) Int. Cl.
*H04B 1/00* (2006.01)
(52) U.S. Cl. .................. 375/148; 375/346; 375/350
(58) Field of Classification Search .......... 375/140–142, 375/144, 147, 148, 150, 260, 284, 285, 267, 375/340, 343, 346, 347, 349, 350
See application file for complete search history.

(56) References Cited

U.S. PATENT DOCUMENTS

| | | | |
|---|---|---|---|
| 7,190,665 B2 * | 3/2007 | Warke et al. | 370/201 |
| 7,609,789 B2 * | 10/2009 | Leshem | 375/346 |
| 7,653,160 B2 * | 1/2010 | Piirainen | 375/346 |
| 2004/0042532 A1 | 3/2004 | Artamo et al. | |

FOREIGN PATENT DOCUMENTS

EP   1185002 A2   3/2002

OTHER PUBLICATIONS

Shellhammer, Steve et al., "Spectrum sensing simulation model", http://grouper.ieee.org/groups/802/22/Meeting_documents/2006_July/22-06-0028-07-0000-Spectrum-Sensing-Simulation-Model.doc, Jul. 2006 (cited in the application), 17 pages.

* cited by examiner

*Primary Examiner* — Dac Ha
(74) *Attorney, Agent, or Firm* — Altera Law Group, LLC

(57) ABSTRACT

A method of determining as to whether a received signal includes an information signal is provided. The method provided includes determining a covariance matrix from a received signal and transforming the covariance matrix into a transformed covariance matrix, wherein the transformation is configured such that the transformed covariance matrix is a non-diagonal matrix in case the received signal includes the information signal, wherein the non-diagonal matrix includes non-zero non-diagonal matrix elements. The method provided further includes determining a first function using at least one of the non-zero non-diagonal matrix elements of the transformed covariance matrix, determining a second function using at least one matrix element of the transformed covariance matrix, wherein the second function is different from the first function, and determining as to whether a received signal includes an information signal based on a comparison of a value of the first function and a value of the second function.

28 Claims, 8 Drawing Sheets

| EG-2dB | EG-1.5dB | EG-1dB | EG-0.5dB | EG-0dB (no uncertainty) | CAV | CFN |
|---|---|---|---|---|---|---|
| 0.499 | 0.497 | 0.495 | 0.487 | 0.102 | 0.103 | 0.104 |

US 8,259,783 B2

METHOD OF DETERMINING AS TO WHETHER A RECEIVED SIGNAL INCLUDES AN INFORMATION SIGNAL

The present application claims the benefit of U.S. provisional application 60/864,644 (filed on 7 Nov. 2006), the entire contents of which are incorporated herein by reference for all purposes.

FIELD OF THE INVENTION

Embodiments of the invention relate to the field of wireless communications. By way of example, embodiments of the invention relate to a method of determining as to whether a received signal includes an information signal as well as a corresponding determining unit and an electronic device comprising the said corresponding determining unit.

BACKGROUND OF THE INVENTION

The uniqueness in the operation of a cognitive radio is that a cognitive radio is able to sense the spectral environment over a wide frequency band and exploit this information to provide wireless links that best meet a user's communications requirements. In this context, the cognitive radio does not have primary access rights to the frequency band used. As such, it is necessary that the cognitive radio is able to dynamically detect the presence of the signals transmitted by the primary users, so that it can avoid transmitting signals in the frequency channels used by the primary users.

Energy detection is a commonly used method for sensing or detecting the presence of signals transmitted by the primary users. Unlike coherent detection, energy detection does not need any information on the signal to be detected. As such, energy detection is robust against unknown multi-path fading.

However, energy detection is vulnerable to noise uncertainty, because this method requires accurate knowledge of noise power. In this regard, there are many causes of noise uncertainty, for example, non-linearity of components, thermal noise in components (which is non-uniform and time varying), and noise due to signal transmissions from other users. Accordingly, it is virtually impossible in practice to obtain accurate knowledge of noise power.

SUMMARY OF THE INVENTION

In one embodiment of the invention, a method of determining as to whether a received signal includes an information signal is provided. The method of determining as to whether a received signal includes an information signal provided may include determining a covariance matrix from a received signal and transforming the covariance matrix into a transformed covariance matrix, wherein the transformation is configured such that the transformed covariance matrix is a non-diagonal matrix in case the received signal includes the information signal, and wherein the non-diagonal matrix includes non-zero non-diagonal matrix elements. The method provided further includes determining a first function using at least one of the non-zero non-diagonal matrix elements of the transformed covariance matrix, determining a second function using at least one matrix element of the transformed covariance matrix, wherein the second function is different from the first function, and determining as to whether a received signal includes an information signal based on a comparison of a value of the first function and a value of the second function.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DETAILED DESCRIPTION OF THE INVENTION

Figure 1:
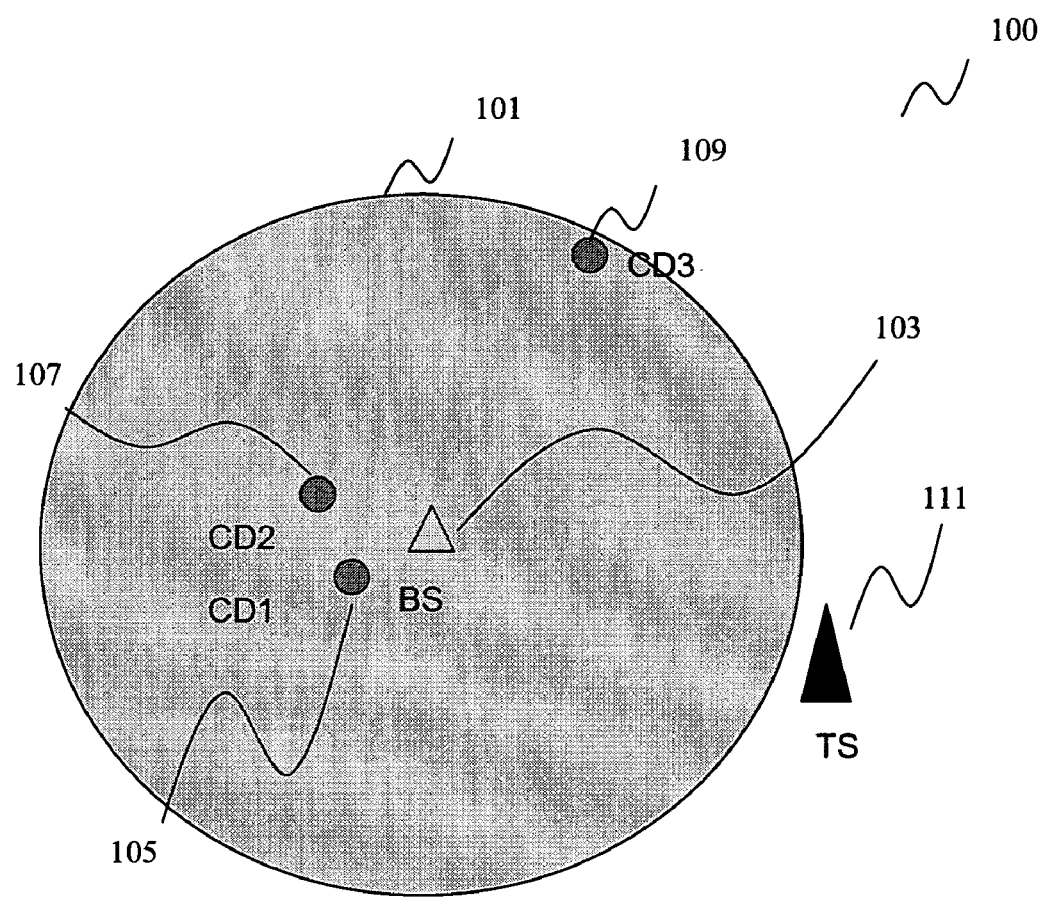
FIG. 1 shows a communication system in which a method of determining as to whether a received signal includes an information signal according to one embodiment of the invention may be used.

As mentioned earlier, the difficulty in obtaining an accurate knowledge of noise power compromises the reliability of the process of sensing or detecting the presence of signals transmitted by the primary users carried out using the energy detection method. According to one embodiment of the invention, a method of determining as to whether a received signal includes an information signal is provided based on the statistical covariance or the auto-correlation values of the received signal.

In the context of the present invention, two hypotheses are first made. In the first hypothesis, the received signal contains only noise. In the second hypothesis, the received signal contains an information signal as well as noise.

It is known that the statistical covariance of the received signal, in case when the received signal contains only noise (the first hypothesis), can be expected to be different from the statistical covariance of the received signal, in case when the received signal contains an information signal as well as noise (the second hypothesis).

Further, the statistical covariance of noise may be determined by the receiving filter. As such, the structure of the statistical covariance matrix of noise is known to the receiver. Based on the knowledge of this structure, a transformation may be obtained.

Next, an approximation to the statistical covariance matrix of the received signal may be obtained (as a sample covariance matrix). Following which, the sample covariance matrix is transformed (using the transformation obtained earlier) into a transformed sample covariance matrix.

As used herein, the term covariance matrix may refer to the sample covariance matrix. Similarly, the term transformed covariance matrix may refer to the transformed sample covariance matrix.

When there is no information signal in the received signal, all the non-diagonal elements of the transformed covariance matrix would have zero values. However, when there is an information signal in the received signal, some of the non-diagonal elements of the transformed covariance matrix would have non-zero values. This observation may then be used to determine as to whether a received signal includes an information signal.

According to an embodiment of the invention, a method of determining as to whether a received signal includes an information signal is provided. The method of determining as to whether a received signal includes an information signal provided may include determining a covariance matrix from a received signal and transforming the covariance matrix into a transformed covariance matrix, wherein the transformation is configured such that the transformed covariance matrix is a non-diagonal matrix in case the received signal includes the information signal, and wherein the non-diagonal matrix includes non-zero non-diagonal matrix elements. The method provided further includes determining a first function using at least one of the non-zero non-diagonal matrix elements of the transformed covariance matrix, determining a second function using at least one matrix element of the transformed covariance matrix, wherein the second function is different from the first function, and determining as to whether a received signal includes an information signal based on a comparison of a value of the first function and a value of the second function.

In one embodiment of the invention, the method provided further includes filtering the received signal.

In one embodiment of the invention, the method provided further includes sampling the received signal. In another embodiment of the invention, the method provided further includes filtering the sampled received signal.

In one embodiment of the invention, the method provided further includes determining at least one auto-correlation value of the sampled received signal.

In one embodiment of the invention, each matrix element of the covariance matrix is generated using an auto-correlation value of the sampled received signal.

In one embodiment of the invention, each matrix element of the covariance matrix is an auto-correlation value of the sampled received signal or the conjugate of an auto-correlation value of the sampled received signal.

In one embodiment of the invention, the second function is determined using at least one of the diagonal matrix elements of the transformed covariance matrix.

In one embodiment of the invention, the first function includes the absolute value of the at least one of the non-zero non-diagonal matrix elements of the transformed covariance matrix and the second function includes the absolute value of the at least one of the diagonal matrix elements of the transformed covariance matrix.

In another embodiment of the invention, the first function includes the Frobenius norm of the at least one of the non-zero non-diagonal matrix elements of the transformed covariance matrix and the second function includes the Frobenius norm of the at least one of the diagonal matrix elements of the transformed covariance matrix.

In one embodiment of the invention, a scaling factor is used in the comparison between the value of the first function and the value of the second function.

In one embodiment of the invention, the determining as to whether a received signal includes an information signal based on a comparison of a value of the first function and a value of the second function, further includes, in case the value of the first function is greater than the value of the second function multiplied by the scaling factor, then classifying that the received signal includes an information signal, and in case the value of the first function is less than or equal to the value of the second function multiplied by the scaling factor, then classifying that the received signal does not include an information signal.

In one embodiment, the transformed covariance matrix is a diagonal matrix in case the received signal does not include the information signal.

In another embodiment of the invention, a determining unit for determining as to whether a received signal includes an information signal is provided. The determining unit includes a first determining unit configured to determine a covariance matrix from a received signal, and a transform unit configured to transform the covariance matrix into a transformed covariance matrix, wherein the transformation is configured such that the transformed covariance matrix is a non-diagonal matrix in case the received signal includes the information signal, wherein the non-diagonal matrix includes non-zero non-diagonal matrix elements. The determining unit further includes a second determining unit configured to determine a first function using at least one of the non-zero non-diagonal matrix elements of the transformed covariance matrix, a third determining unit configured to determine a second function using at least one matrix element of the transformed covariance matrix, wherein the second function is different from the first function, and a fourth determining unit configured to determine as to whether a received signal includes an information signal based on a comparison of a value of the first function and a value of the second function.

In one embodiment of the invention, the determining unit further includes a filter for filtering the received signal.

In one embodiment of the invention, the determining unit further includes a sampling unit for sampling the received signal. In another embodiment of the invention, the determining unit further includes a filter for filtering the sampled received signal.

In one embodiment of the invention, the second function is determined using at least one of the diagonal matrix elements of the transformed covariance matrix.

In one embodiment of the invention, the first function includes the absolute value of the at least one of the non-zero non-diagonal matrix elements of the transformed covariance matrix and the second function includes the absolute value of the at least one of the diagonal matrix elements of the transformed covariance matrix.

In one embodiment of the invention, the first function includes the Frobenius norm of the at least one of the non-zero non-diagonal matrix elements of the transformed covariance matrix and the second function includes the Frobenius norm of the at least one of the diagonal matrix elements of the transformed covariance matrix.

In one embodiment of the invention, the fourth determining circuit is configured to use a scaling factor in the comparison between the value of the first function and the value of the second function.

In one embodiment, the transformed covariance matrix is a diagonal matrix in case the received signal does not include the information signal.

In one embodiment of the invention, an electronic device which includes the determining unit described earlier is provided.

In one embodiment of the invention, the electronic device is a sensing wireless device. In another embodiment of the invention, the electronic device provided further being configured as an electronic device selected from a group of electronic devices consisting of a communication terminal, and a medium player device configured to play at least one medium.

In one embodiment of the invention, the electronic device provided further includes a receiver to receive a signal.

In one embodiment of the invention, a computer program product is provided. The computer program product provided, when being executed by a computer, makes the computer perform a method for determining as to whether a received signal includes an information signal which includes determining a covariance matrix from a received signal, transforming the covariance matrix into a transformed covariance matrix, wherein the transformation is configured such that the transformed covariance matrix is a non-diagonal matrix in case the received signal includes the information signal, wherein the non-diagonal matrix includes non-zero non-diagonal matrix elements, determining a first function using at least one of the non-zero non-diagonal matrix elements of the transformed covariance matrix, determining a second function using at least one matrix element of the transformed covariance matrix, wherein the second function is different from the first function, and determining as to whether a received signal includes an information signal based on a comparison of a value of the first function and a value of the second function.

The embodiments which are described in the context of the method of determining as to whether a received signal includes an information signal provided are analogously valid for the determining unit, the electronic device and the computer program product, and vice versa.

FIG. 1 shows a communication system 100 in which the method of determining as to whether a received signal includes an information signal according to one embodiment of the invention may be used.

The communication system 100 includes a communication system cell 101, in which a base station (BS) 103, a first communication device (CD1) 105, a second first communication device (CD2) 107 and a third first communication device (CD3) 109 are located.

The communication system 100 operates based on the concept of cognitive radio. As such, the data transmission of the communication system cell 101 may use only frequency ranges not used by a television (TV) transmission station (TS) 111, which is located near the communication cell 101.

As a side remark, it should be noted that the TV transmission station (TS) 111 is not part of the communication system 100. Instead, the TV transmission station (TS) 111 may be considered as a primary user, since a portion of the frequency range of interest to the communication system 100 has been assigned for dedicated use by the TV transmission station (TS) 111. In this case, the information signal discussed earlier refers to the TV transmission (or broadcast) signal.

For example, the communication system 100 may represent the proposed IEEE 802.22 wireless regional area network (WRAN). The proposed IEEE 802.22 WRAN operates in the very high frequency (VHF) and the ultra high frequency (UHF) frequency band (between 47 MHz and 910 MHz), which have already been allocated for the use of TV broadcast and Part 74 wireless microphone devices.

In order to avoid causing interference to TV broadcast signals and to Part 74 devices, WRAN devices, such as base stations (BS) and customer premise equipments (CPE) (for example, CD1 105, CD2 107 and CD3 109), must be able to carry out a reliable detection of the signals transmitted by primary users, while determining the availability of the frequency ranges in which they are operating. As such, embodiments of the method of determining as to whether a received signal includes an information signal provided by the present invention may be used for this purpose.

Figure 2:
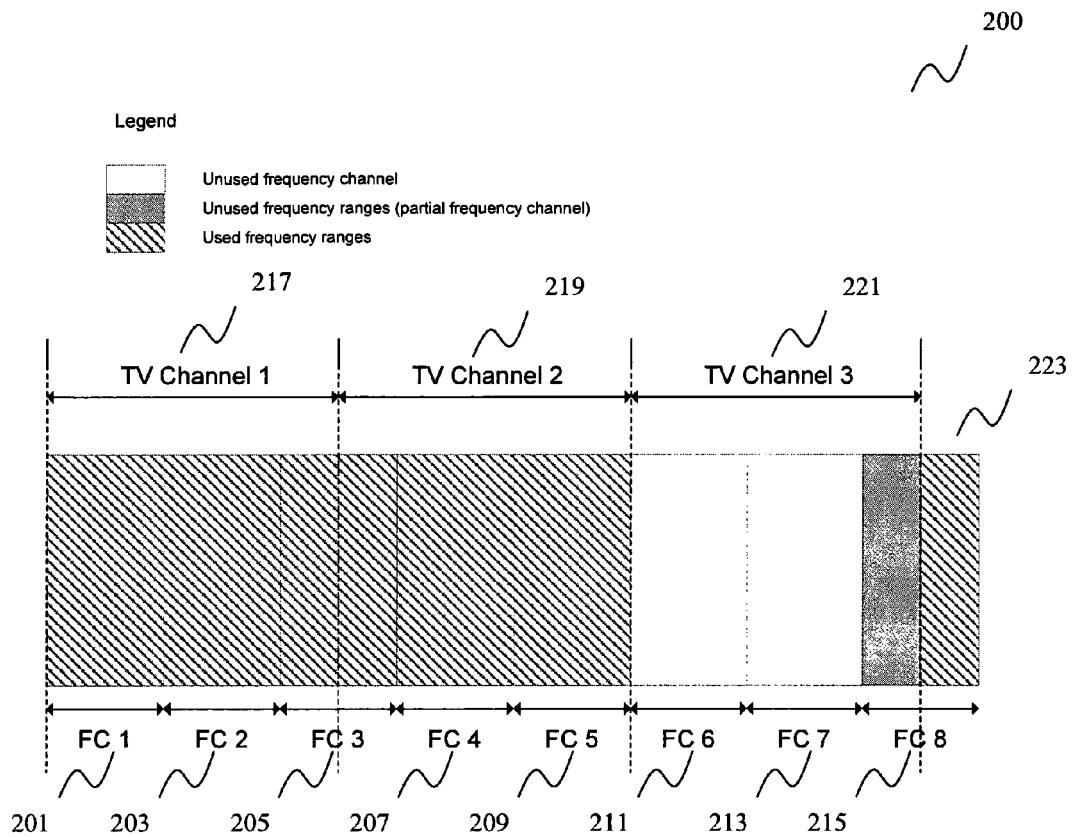
FIG. 2 shows an illustration of how frequency ranges may be used by the communication system shown in FIG. 1 according to one embodiment of the invention.

FIG. 2 shows an illustration of how frequency ranges may be used by the communication system 100 shown in FIG. 1 according to one embodiment of the invention.

In this illustration, it is assumed that the entire frequency range 200 is of interest to the said communication system. The communication system 100 may then assign a selected portion of the frequency range to a logical frequency channel, for example, the first logical frequency channel (FC 1) 201, the second logical frequency channel (FC 2) 203, the third logical frequency channel (FC 3) 205, the fourth logical frequency channel (FC 4) 207, the fifth logical frequency channel (FC 5) 209, the sixth logical frequency channel (FC 6) 211, the seventh logical frequency channel (FC 7) 213 and the eighth logical frequency channel (FC 8) 215.

As with any cognitive radio, in order to determine whether there are available (or unused) frequency channels, the communication system 100 may then periodically perform the process of sensing (or determining whether there are signal transmissions by primary users) in the respective frequency channels in the entire frequency range of interest. For example, the communication system 100 may perform the process of sensing on one logical frequency channel at a time, from the first frequency channel (FC 1) 201 to the eighth frequency channel (FC 8) 215. In this context, the process of sensing may be performed using the embodiments of the method of determining as to whether a received signal includes an information signal provided by the present invention.

As a side note, as shown in FIG. 2, the communication system 100 would find out, as a result of the process of sensing performed, that only the sixth logical channel (FC 6) 211 and the seventh logical channel (FC 7) 213 are unused, and are thus available for the communication system 100 to use in communication or data transmission.

Further, it can also be seen from FIG. 2 that the other logical frequency channels are occupied (or used) due to the TV signal transmissions on TV Channel 1 (217) and TV Channel 2 (219) (for example, by the television transmission station (TS) 111), and an unknown primary user (223).

Additionally, it can be seen that there is no signal transmission on TV Channel 3 (221) at the point in time when the process of sensing was performed, even though that portion of frequency range had already been allocated for TV Channel 3 (221). This may be because TV Channel 3 (221) was not broadcast to the said area or the said time was not within the operating hours of TV Channel 3 (221).

Figure 3:
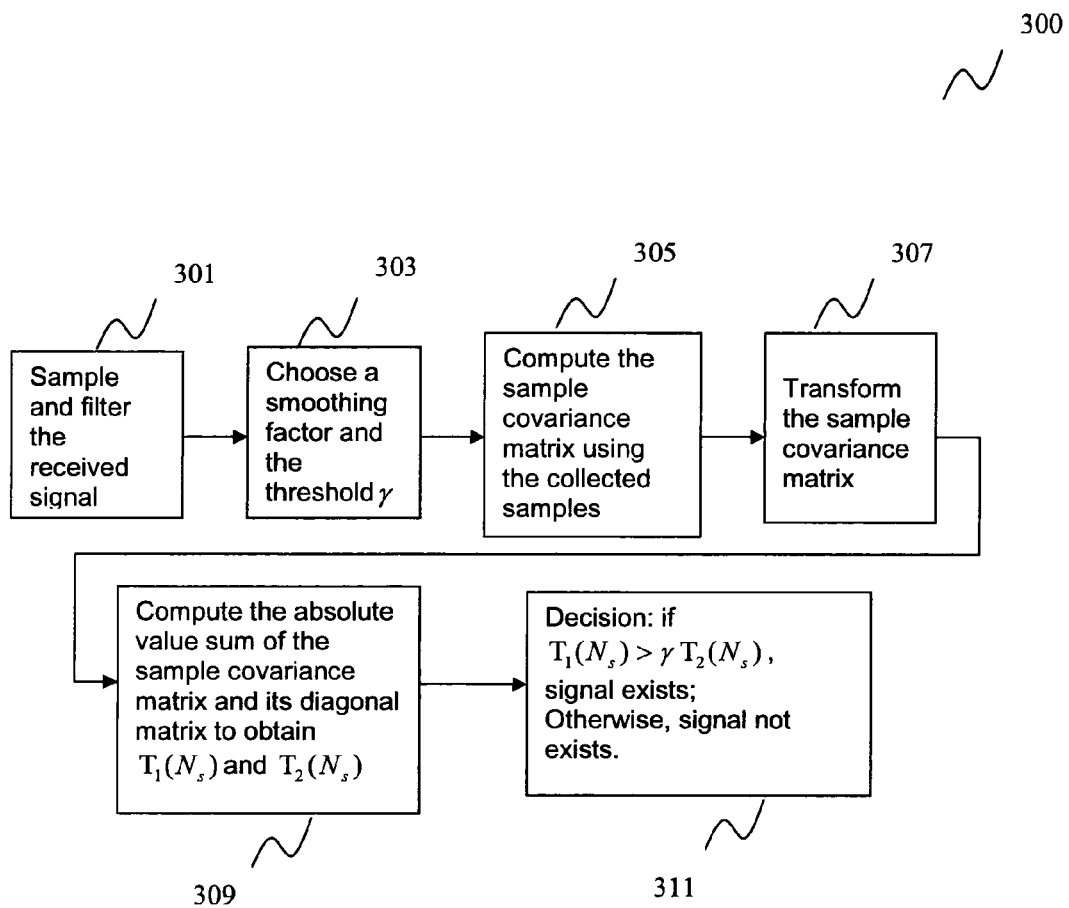
FIG. 3 shows a flow diagram illustrating how a first method of determining as to whether a received signal includes an information signal may be performed, according to one embodiment of the invention.

FIG. 3 shows a flow diagram 300 illustrating how a first method of determining as to whether a received signal includes an information signal may be performed, according to one embodiment of the invention.

Before discussing the first method of determining as to whether a received signal includes an information signal, the terms and equations used by the said first method are first described as follows.

Let y(t) represent a continuous time received signal. The frequency band of interest is represented as a central frequency $f_c$ and a bandwidth W.

The received signal y(t) is sampled at a sampling rate $f_s$, where $f_s \geq W$. Accordingly, the sampling period $T_s$ is given by $T_s=1/f_s$. In an exemplary embodiment, the sampling rate may be selected as 21.5 MHz, for example, in the case of the information signal being the digital television (DTV) broadcast signal.

In view of the above, the $n^{th}$ sample of the sampled received signal x(n) is given by $x(n)=y(nT_s)$.

In this context, two hypotheses are made. In the first hypothesis $H_0$, the received signal contains only noise. In the second hypothesis $H_1$, the received signal contains an information signal as well as noise.

The received signal samples under the two hypotheses are respectively given by $$H_0: x(n)=\eta(n) \qquad (1)$$

$$H_1: x(n)=s(n)+\eta(n) \qquad (2)$$

where s(n) is the sampled information signal transmitted through the wireless communication channel, and $\eta(n)$ is the sampled white noise.

As a side note, the sampled information signal s(n) may be considered to include the signal degradation effects such as fading and multi-path. Further, the sampled information signal s(n) may also be the superposition of more than one information signal.

Next, the sampled received signal is passed through a bandpass filter. The bandpass filter is represented by f(k), k=0,1, . . . , K where $$\sum_{k=0}^{K} |f(k)|^2 = 1.$$

Therefore, the auto-correlation of the filter g(n) is given by $$g(n) = \sum_{k=0}^{K} f^*(k) f(n+k), n = 0,1, \dots ,K \qquad (3)$$

Further, a function $\mu(N)$ is defined, wherein $$\mu(N) = N|g(0)|^2 + 2\sum_{n=1}^{K}(N-n)|g(n)|^2 \qquad (4)$$

Following the process of filtering, the filtered sampled received signal $\tilde{x}(n)$ is given by $$\tilde{x}(n) = \sum_{k=0}^{K} f(k) x(n-k), n = 0, 1, \dots \qquad (5)$$

In a similar manner, based on equations (2) and (5), the filtered sampled information signal and the filtered sampled noise may be respectively defined as $$\tilde{s}(n) = \sum_{k=0}^{K} f(k) s(n-k), n = 0, 1, \dots \qquad (6)$$

$$\tilde{\eta}(n) = \sum_{k=0}^{K} f(k) \eta(n-k), n = 0, 1, \dots \qquad (7)$$

Following which, equations (2) and (3) may be respectively rewritten as $$H_0: \tilde{x}(n)=\tilde{\eta}(n) \qquad (8)$$

$$H_1: \tilde{x}(n)=\tilde{s}(n)+\tilde{\eta}(n) \qquad (9)$$

Next, a smoothing factor L is selected, and the received signal vector x(n) is defined as $$x(n)=[\tilde{x}(n)\tilde{x}(n-1)\dots\tilde{x}(n-L+1)]^T, n=0,1,\dots,N_s-1 \qquad (10)$$

Further, a L×(L+K) matrix is defined as follows $$H = \begin{bmatrix} f(0) & f(1) & \dots & f(K) & 0 & \dots & 0 \\ 0 & f(0) & \dots & f(K-1) & f(K) & \dots & 0 \\ & & \dots & & \dots & & \\ 0 & 0 & \dots & f(0) & f(1) & \dots & f(K) \end{bmatrix} \qquad (11)$$

Let G be a matrix is defined as $G=HH^H$. Following which, the matrix G is decomposed as $G=Q^2$, where the matrix Q is a L×L Hermitian matrix.

Denoting the statistical covariance matrix of the received signal $R_x$ as $$R_x = E(x(n)x(n)^H) \qquad (12)$$

Then, the statistical covariance matrix of the received signal $R_x$ may be represented by $$R_x = R_s + \sigma_\eta^2 G \qquad (13)$$

where $R_s$ is the statistical covariance matrix of the information signal and $\sigma_\eta^2$ is the noise variance.

Therefore, the transformed statistical covariance matrix of the received signal $\tilde{R}_x$ and the transformed statistical covariance matrix of the information signal $\tilde{R}_S$ are respectively given by $$\tilde{R}_x = Q^{-1} R_x Q^{-1} \qquad (14)$$

$$\tilde{R}_s = Q^{-1} R_s Q^{-1} \qquad (15)$$

Then, equation (13) may be rewritten as $$\tilde{R}_x = \tilde{R}_s + \sigma_\eta^2 I \qquad (16)$$

From equation (13), it can be seen that if the received signal does not include an information signal, then $\tilde{R}_s=0$. As such, the non-diagonal elements of the transformed statistical covariance matrix of the received signal $\tilde{R}_x$ all have zero values.

Similarly, if the received signal includes an information signal, the transformed statistical covariance matrix of the information signal $\tilde{R}_s$, would not be a diagonal matrix. Accordingly, some of the non-diagonal elements of the transformed statistical covariance matrix of the received signal $\tilde{R}_x$ would have non-zero values.

Next, let the elements of the transformed statistical covariance matrix of the received signal $\tilde{R}_x$ be denoted by $r_{nm}$. The following functions are then defined as $$T_1 = \frac{1}{L}\sum_{n=1}^{L}\sum_{m=1}^{L}|r_{nm}| \qquad (17)$$

$$T_2 = \frac{1}{L}\sum_{n=1}^{L}|r_{nn}| \qquad (18)$$

$$T_3 = \frac{1}{L}\sum_{n=1}^{L}\sum_{m=1}^{L}|r_{nm}|^2 \qquad (19)$$

$$T_4 = \frac{1}{L}\sum_{n=1}^{L}|r_{nn}|^2 \qquad (20)$$

Applying the earlier observation from equation (13), if the received signal does not include an information signal, then $T_1=T_2$, and $T_3=T_4$. Likewise, if the received signal includes an information signal, then $T_1>T_2$, and $T_3>T_4$.

As a side remark, it should be noted that the statistical covariance matrix may be approximated by a sample covariance matrix, based on a limited number of signal samples. As such, when the statistical covariance matrix is used, if the received signal does not include an information signal, then $T_1=T_2$, and $T_3=T_4$. However, when the (approximated) sample covariance matrix is used instead, if the received signal does not include an information signal, then $T_1 \cong T_2$ and $T_3 \cong T_4$; it should be noted that the expressions $T_1=T_2$, and $T_3=T_4$ no longer apply in this case.

In view of the above, as shown in FIG. 3, the first step in the first method of determining as to whether a received signal includes an information signal is to sample and then filter the received signal (step 301).

Following which, in step 303, a smoothing factor L is selected. Then, the threshold γ is computed as follows $$\gamma = \frac{1 + (L-1)\sqrt{\frac{2}{N_s \pi}}}{1 + \left(\frac{\mu(N_s)}{N_s}\right)^\alpha Q^{-1}(1-P_0)\sqrt{\frac{2}{N_s}}} \qquad (21)$$

where $$Q(t) = \frac{1}{\sqrt{2\pi}}\int_t^\infty e^{-t^2/2}\,dt, \qquad (22)$$

$P_0$ is the probability of false alarm and α is a positive number, and where α is selected in a way such that the desired probability of false alarm $P_0$ may be obtained.

Next, in step 305, the auto-correlation values of the filtered sampled received signal λ(l) is computed as follows $$\lambda(l) = \frac{1}{N_s}\sum_{m=0}^{N_s-1}\tilde{x}(m)\tilde{x}^*(m-l),\, l=0,1,\ldots,L-1 \qquad (23)$$

The auto-correlation values of the filtered sampled received signal λ(l) are then used to form the (sample) covariance matrix of the received signal $R(N_s)$ as follows $$R(N_s) = \begin{bmatrix} \lambda(0) & \lambda(1) & \ldots & \lambda(L-1) \\ \lambda(1)^* & \lambda(0) & \ldots & \lambda(L-2) \\ \vdots & \vdots & \vdots & \vdots \\ \lambda(L-1)^* & \lambda(L-2)^* & \ldots & \lambda(0) \end{bmatrix} \qquad (24)$$

It should be noted that the (sample) covariance matrix of the received signal $R(N_s)$ is Hermitian and Toeplitz. As mentioned earlier, the sample covariance matrix may be considered as an approximation of the statistical covariance matrix $R_x$.

Following which, in step 307, the (sample) covariance matrix of the received signal $R(N_s)$ is transformed in order to obtain the transformed (sample) covariance matrix of the received signal $\tilde{R}(N_s)$ as follows $$\tilde{R}(N_s) = Q^{-1}R(N_s)Q^{-1} \qquad (25)$$

Next, in step 309, the first function $T_1(N_s)$ and the second function $T_2(N_s)$ are respectively computed as follows $$T_1(N_s) = \frac{1}{L}\sum_{n=1}^{L}\sum_{m=1}^{L}|r_{nm}(N_s)| \qquad (26)$$

$$T_2(N_s) = \frac{1}{L}\sum_{n=1}^{L}|r_{nn}(N_s)| \qquad (27)$$

where $r_{nm}(N_s)$ are the elements of the transformed (sample) covariance matrix of the received signal $\tilde{R}(N_s)$.

As a side remark, it can be seen from equation (26) that the computation of the first function includes the absolute value of the at least one of the non-zero non-diagonal matrix elements of the transformed (sample) covariance matrix of the received signal. Similarly, it can be seen from equation (27) that the computation of the second function includes the absolute value of the at least one of the diagonal matrix elements of the transformed (sample) covariance matrix of the received signal.

Following which, in step 311, whether the received signal includes an information signal is determined as follows: If $T_1(N_s) > \gamma T_2(N_s)$, then the received signal includes an information signal; otherwise, the received signal does not include an information signal.

Figure 4:
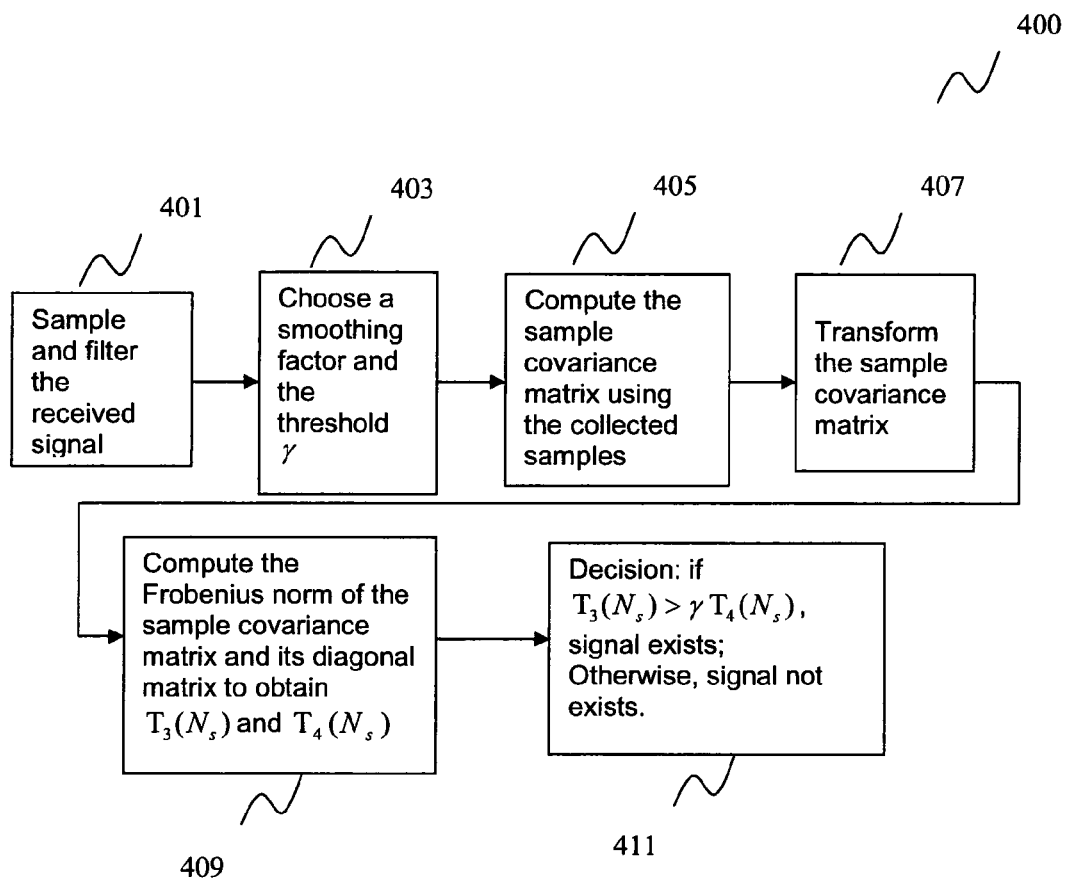
FIG. 4 shows a flow diagram illustrating how a second method of determining as to whether a received signal includes an information signal may be performed, according to one embodiment of the invention.

FIG. 4 shows a flow diagram 400 illustrating how a second method of determining as to whether a received signal includes an information signal may be performed, according to one embodiment of the invention.

The second method of determining as to whether a received signal includes an information signal may be described as follows.

As shown in FIG. 4, the first step in the second method of determining as to whether a received signal includes an information signal is to sample and then filter the received signal (step 401). This step is the same as step 301 in the first method of determining as to whether a received signal includes an information signal discussed earlier in relation to FIG. 3.

Following which, in step 403, a smoothing factor L is selected. Then, the threshold γ is computed as follows $$\gamma = \frac{L + N_s + 1}{N_s + 2 + \left(\frac{\mu(N_s)}{N_s}\right)^\beta Q^{-1}(1-P_0)\sqrt{8N_s + 40 + 48/N_s}} \qquad (28)$$

where $P_0$ is the probability of false alarm, and $\beta$ is a negative number, and where $\beta$ is selected in a way such that the desired probability of false alarm $P_0$ may be obtained.

Next, in step 405, the auto-correlation values of the filtered sampled received signal $\lambda(l)$ is computed as follows $$\lambda(l) = \frac{1}{N_s} \sum_{m=0}^{N_s-1} \tilde{x}(m)\tilde{x}^*(m-l), l = 0, 1, \ldots, L-1 \qquad (29)$$

The auto-correlation values of the filtered sampled received signal $\lambda(l)$ are then used to form the (sample) covariance matrix of the received signal $R(N_s)$ as follows $$R(N_s) = \begin{bmatrix} \lambda(0) & \lambda(1) & \ldots & \lambda(L-1) \\ \lambda(1)^* & \lambda(0) & \ldots & \lambda(L-2) \\ \vdots & \vdots & \vdots & \vdots \\ \lambda(L-1)^* & \lambda(L-2)^* & \ldots & \lambda(0) \end{bmatrix} \qquad (30)$$

It should be noted that the (sample) covariance matrix of the received signal $R(N_s)$ is Hermitian and Toeplitz.

Following which, in step 407, the (sample) covariance matrix of the received signal $R(N_s)$ is transformed in order to obtain the transformed (sample) covariance matrix of the received signal $\tilde{R}(N_s)$ as follows $$\tilde{R}(N_s) = Q^{-1} R(N_s) Q^{-1} \qquad (31)$$

Next, in step 409, the first function $T_3(N_s)$ and the second function $T_4(N_s)$ are respectively computed as follows $$T_3(N_s) = \frac{1}{L} \sum_{n=1}^{L} \sum_{m=1}^{L} |r_{nm}(N_s)|^2 \qquad (32)$$

$$T_4(N_s) = \frac{1}{L} \sum_{n=1}^{L} |r_{nn}(N_s)|^2 \qquad (33)$$

where $r_{nm}(N_s)$ are the elements of the transformed (sample) covariance matrix of the received signal $\tilde{R}(N_s)$.

As a side remark, it can be seen from equation (32) that the computation of the first function includes the Frobenius norm of the at least one of the non-zero non-diagonal matrix elements of the transformed (sample) covariance matrix of the received signal. Similarly, it can be seen from equation (33) that the computation of the second function includes the Frobenius norm of the at least one of the diagonal matrix elements of the transformed (sample) covariance matrix of the received signal.

Following which, in step 411, whether the received signal includes an information signal is determined as follows: If $T_3(N_s) > \gamma T_4(N_s)$, then the received signal includes an information signal; otherwise, the received signal does not include an information signal.

Figure 5:
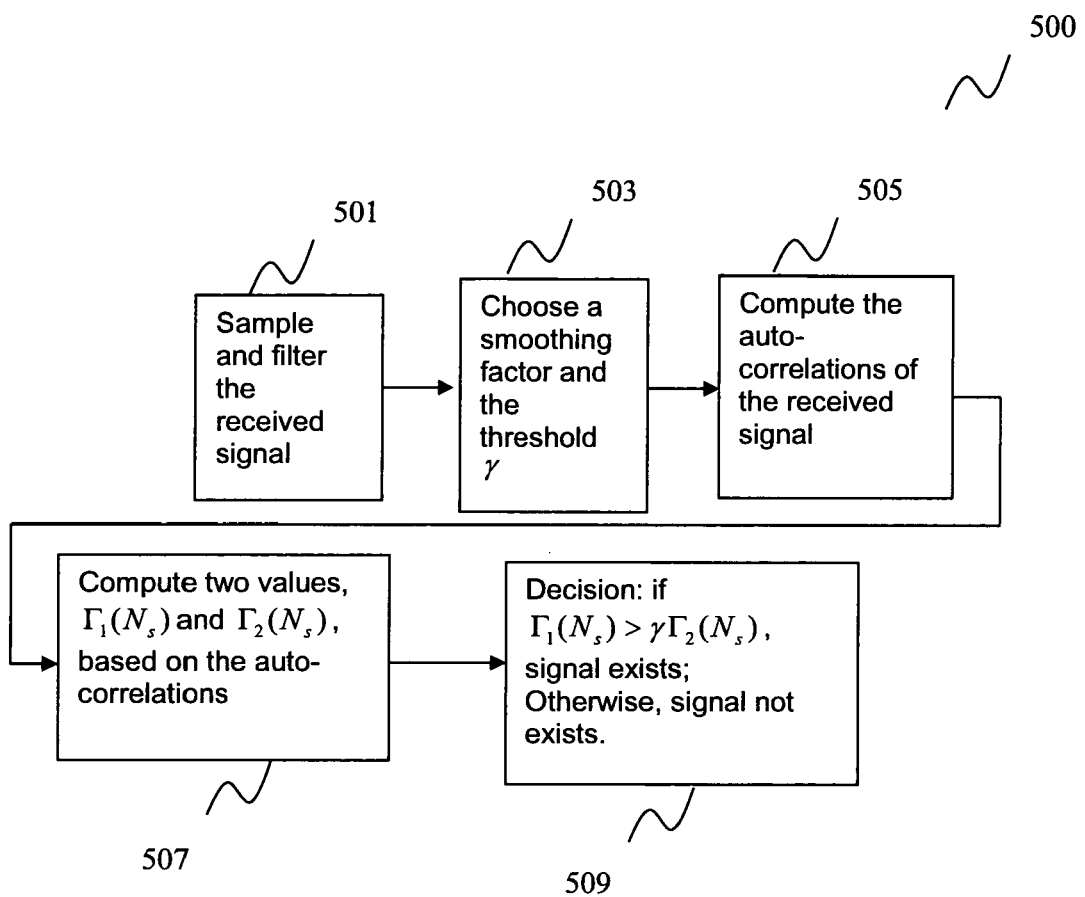
FIG. 5 shows a flow diagram illustrating how a generalized method of determining as to whether a received signal includes an information signal may be performed, according to one embodiment of the invention.

FIG. 5 shows a flow diagram illustrating how a generalized method of determining as to whether a received signal includes an information signal may be performed, according to one embodiment of the invention.

The generalized method of determining as to whether a received signal includes an information signal may be described as follows.

As shown in FIG. 5, the first step in the second method of determining as to whether a received signal includes an information signal is to sample and then filter the received signal (step 501).

Following which, in step 503, a smoothing factor L is selected, and then the threshold $\gamma$ is selected in a way such that the desired probability of false alarm may be obtained.

Next, in step 505, the auto-correlation values of the filtered sampled received signal $\lambda(l)$ is computed as follows $$\lambda(l) = \frac{1}{N_s} \sum_{m=0}^{N_s-1} \tilde{x}(m)\tilde{x}^*(m-l), l = 0, 1, \ldots, L-1 \qquad (34)$$

Next, in step 507, the first function $\Gamma_1(N_s)$ and the second function $\Gamma_2(N_s)$ are respectively computed as follows $$\Gamma_1(N_s) = F_1(\lambda(0), \lambda(1), \ldots, \lambda(L-1)) \qquad (35)$$

$$\Gamma_2(N_s) = F_2(\lambda(0), \lambda(1), \ldots, \lambda(L-1)) \qquad (36)$$

where $F_1$ and $F_2$ are positive functions with the selected smoothing factor L.

Following which, in step 509, whether the received signal includes an information signal is determined as follows: If $\Gamma_1(N_s) > \gamma \Gamma_2(N_s)$, then the received signal includes an information signal; otherwise, the received signal does not include an information signal.

As a side remark, an analysis of the computational complexity in using the embodiments of the method of determining as to whether a received signal includes an information signal discussed earlier is provided here.

The process of filtering the received signal (discussed in relation to steps 301, 401 and 501) requires $(K+1)N_s$, multiplication and $(K+1)N_s$ addition operations. In the case where K is large, a Fast Fourier Transform (FFT) operation may be used instead to reduce the computational complexity.

Further, the computation of the auto-correlation values of the filtered sampled received signal $\lambda(l)$ (in equations (23), (29) and (34)) requires $LN_s$ multiplication and $LN_s$ addition operations.

Additionally, the process of transforming the covariance matrix requires $2L^3$ multiplication and $2L^3$ addition operations.

Finally, the other computations are expected to take at most $L^2$ multiplication and $L^2$ addition operations.

Therefore, the entire computation process of the method of determining as to whether a received signal includes an information signal is expected to be about $(K+L+1)N_s + 2L^3 + L^2$ multiplication and $(K+L+1)N_s + 2L^3 + L^2$ addition operations.

Figure 6:
FIG. 6 shows a table indicating the probability of false alarm obtained for different methods of sensing with the digital television broadcast signal as the information signal.

FIG. 6 shows a table 600 indicating the probability of false alarm obtained for different methods of sensing with the digital television broadcast signal as the information signal.

The simulation results shown in the table of FIG. 6 are obtained based on a spectrum sensing simulation model.

In the simulations, the DTV broadcast signal is considered as the information signal transmitted from primary user. As such, DTV signals are first captured and then fed into the simulation model.

Both the captured DTV signals and white noise are fed into the raised cosine filter of the simulation model. The raised cosine filter is characterized by a bandwidth of 6 MHz and a roll-off factor of ½). Any number of taps may be used in the raised cosine filter. In an exemplary embodiment, 89 taps is used in the raised cosine filter.

Further, the noise variance of the white noise is changed accordingly in order to obtain the various desired SNR levels.

Additionally, the number of samples used is 400000 (corresponding to 18.60 ms sampling period).

Further, the smoothing factor L is selected to be 16, and the threshold $\gamma$ is then selected based on the desired probability of false alarm (which, in this case, has been selected to be 0.1). As a side remark, the threshold γ selected is not related to noise power.

In the table shown in FIG. 6, "EG-2 dB" refers to the energy detection method with 2 dB of noise uncertainty. Similarly, "EG-1.5 dB" refers to the energy detection method with 1.5 dB of noise uncertainty, "EG-1 dB" refers to the energy detection method with 1 dB of noise uncertainty, "EG-0.5 dB" refers to the energy detection method with 0.5 dB of noise uncertainty and "EG-0 dB" refers to the energy detection method with no noise uncertainty.

"CAV" refers to the first method of determining as to whether a received signal includes an information signal, wherein the absolute value (AV) of the elements of the transformed covariance matrix is calculated. "CFN" refers to the second method of determining as to whether a received signal includes an information signal, wherein the Frobenius norm (FN) of the elements of the transformed covariance matrix is calculated.

Figure 7:
FIG. 7 shows a first graph comparing the performance results of two embodiments of the invention against other methods of sensing.
Figure 7:
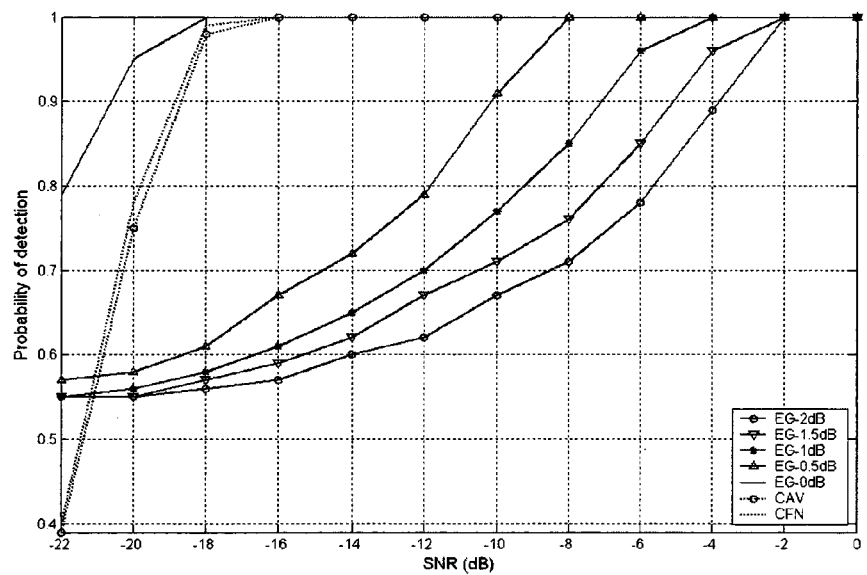
Figure 8:
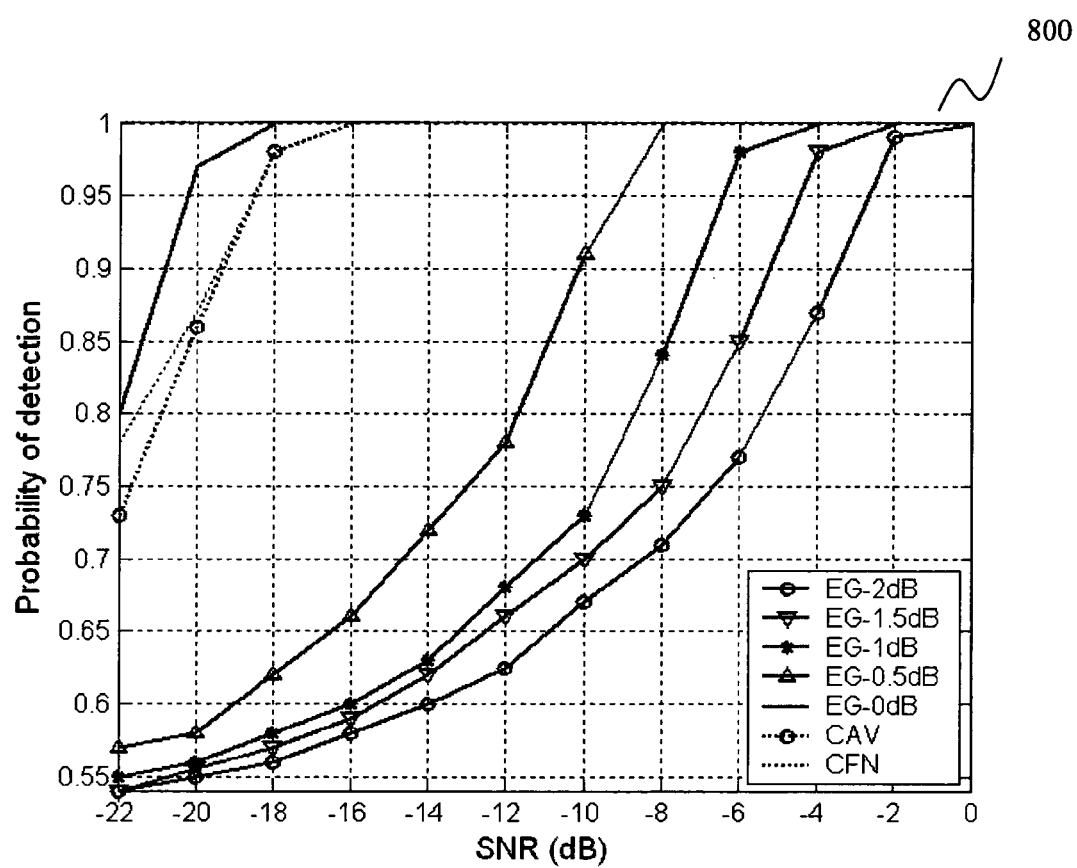
FIG. 8 shows a second graph comparing the performance results of two embodiments of the invention against other methods of sensing.
Figure 9:
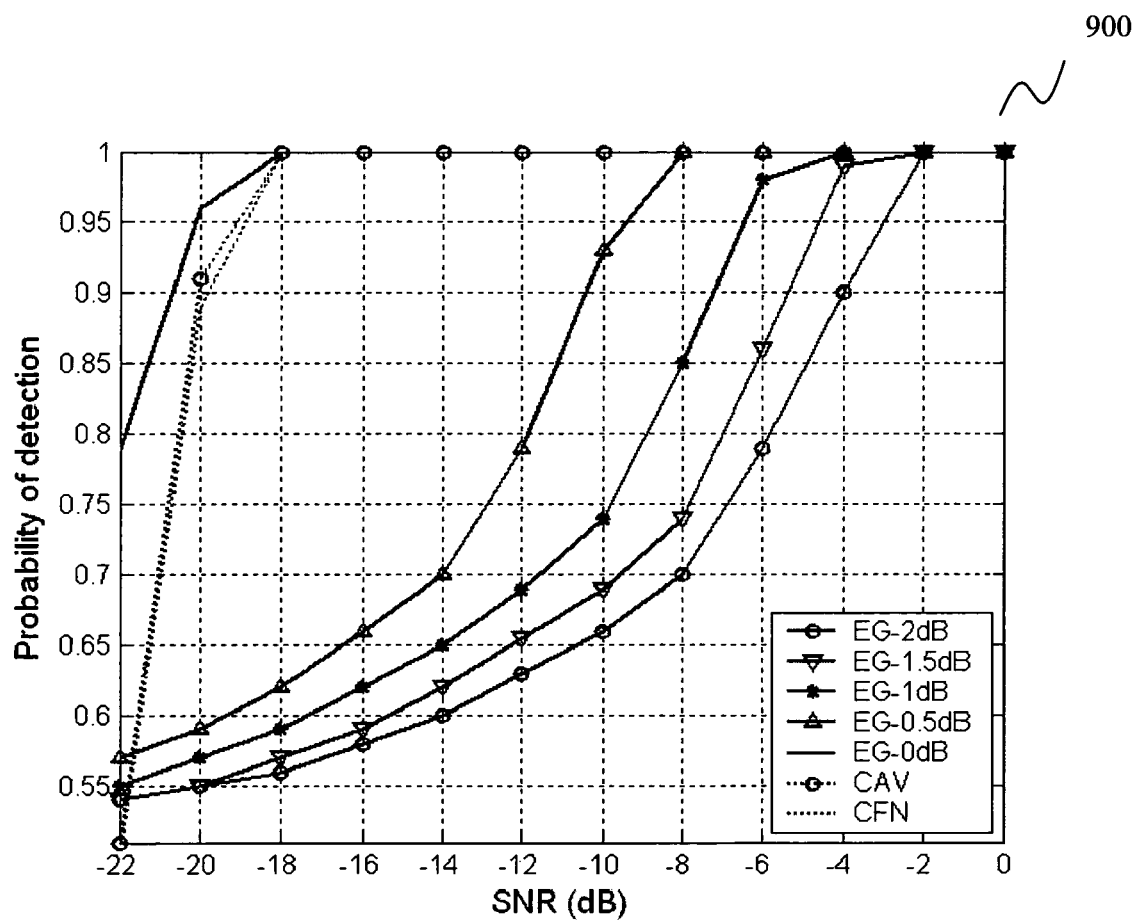
FIG. 9 shows a third graph comparing the performance results of two embodiments of the invention against other methods of sensing.

As a side remark, the earlier discussed references used in FIG. 6 also apply to FIGS. 7, 8 and 9 as well.

From the probability of false alarm shown in FIG. 6, it can be seen that the results for the two embodiments of the method of determining as to whether a received signal includes an information signal (0.103 for CAV and 0.104 for CFN) are close to the desired probability of false alarm (of 0.1).

Further, the results for the two embodiments of the method of determining as to whether a received signal includes an information signal (0.103 for CAV and 0.104 for CFN), are also comparable to that obtained using energy detection with no noise uncertainty (0.102). It should be noted that as mentioned earlier, it is virtually impossible in practice to obtain accurate knowledge of noise power. As such, the case of no noise uncertainty is virtually impossible to achieve in practice. Therefore, the results obtained using energy detection with no noise uncertainty is a theoretical figure which is useful for comparison purposes only.

It can also be seen that the results for the two embodiments of the method of determining as to whether a received signal includes an information signal (0.103 for CAV and 0.104 for CFN), are superior to that using energy detection with 0.5 dB noise uncertainty (0.487).

FIG. 7 shows a first graph 700 comparing the performance results of two embodiments of the invention against other methods of sensing.

The first graph 700 shows the performance results measured by the probability of detection (on the y-axis) versus the signal to noise ratio (SNR) (on the x-axis). In this case, the information signal is the captured Advance Television Systems Committee (ATSC) DTV signal WAS-311/36/01 (see for example reference [1]).

Illustratively, for a probability of detection of 0.9, the comparison of simulation results of FIG. 7 shows that embodiments of the method of determining as to whether a received signal includes an information signal (CAV and CFN) provided by the invention has an at least 8 dB SNR performance improvement over the other methods of sensing studied.

It should be noted that the simulation results obtained using energy detection with no noise uncertainty (EG-0 dB) have been included in FIG. 7 as a reference.

Further, similar observations on the performance improvements achieved by using the embodiments of the method of determining as to whether a received signal includes an information signal provided by the invention, can also be made from FIGS. 8 and 9 as well.

FIG. 8 shows a second graph 800 comparing the performance results of two embodiments of the invention against other methods of sensing.

The second graph 800 shows the performance results measured by the probability of detection (on the y-axis) versus SNR (on the x-axis). In this case, the information signal is the captured ATSC DTV signal WAS-003/27/01 (see for example reference [1]).

FIG. 9 shows a third graph 900 comparing the performance results of two embodiments of the invention against other methods of sensing.

The third graph 900 shows the performance results measured by the probability of detection (on the y-axis) versus SNR (on the x-axis). In this case, the information signal is the captured ATSC DTV signal WAS-049/34/01 (see for example reference [1]).

Embodiments of the invention have the following effect.

As shown by the embodiments of the invention described earlier, the method of determining as to whether a received signal includes an information signal provided shows superior performance compared to other existing sensing methods, in terms of the ability to reliably detect the presence of the signals (for example, those transmitted by the primary users) in a received signal. As such, embodiments of the method of determining as to whether a received signal includes an information signal provided are suitable candidates for use in systems wherein the ability to reliably detect the presence of the signals (for example, those transmitted by the primary users) in a received signal is required, such as cognitive radio systems, for example.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

In this document, the following publication is cited:
[1] Shellhammer, Steve et al., "*Spectrum sensing simulation model*", http://grouper.ieee.org/groups/802/22/Meeting_documents/2006_July/22-06-0028-07-0000-Spectrum-Sensing-Simulation-Model.doc, July 2006.

What is claimed is:

1. A method of determining as to whether a received signal includes an information signal, the method comprising:
   determining a covariance matrix from a received signal;
   transforming the covariance matrix into a transformed covariance matrix, wherein the transformation is configured such that the transformed covariance matrix is a non-diagonal matrix in case the received signal includes the information signal, wherein the non-diagonal matrix comprises non-zero non-diagonal matrix elements;
   determining a first function using at least one of the non-zero non-diagonal matrix elements of the transformed covariance matrix;
   determining a second function using at least one matrix element of the transformed covariance matrix, wherein the second function is different from the first function; and
   determining as to whether a received signal includes an information signal based on a comparison of a value of the first function and a value of the second function.

2. The method of claim 1, further comprising:
   filtering the received signal.

3. The method of claim 1, further comprising:
sampling the received signal.

4. The method of claim 3, further comprising:
filtering the sampled received signal.

5. The method of claim 4, further comprising:
determining at least one auto-correlation value of the sampled received signal.

6. The method of claim 5,
wherein each matrix element of the covariance matrix is generated using an auto-correlation value of the sampled received signal.

7. The method of claim 5,
wherein each matrix element of the covariance matrix is an auto-correlation value of the sampled received signal or the conjugate of an auto-correlation value of the sampled received signal.

8. The method of claim 1,
wherein the second function is determined using at least one of the diagonal matrix elements of the transformed covariance matrix.

9. The method of claim 6,
wherein the first function comprises the absolute value of the at least one of the non-zero non-diagonal matrix elements of the transformed covariance matrix and the second function comprises the absolute value of the at least one of the diagonal matrix elements of the transformed covariance matrix.

10. The method of claim 6,
wherein the first function comprises the Frobenius norm of the at least one of the non-zero non-diagonal matrix elements of the transformed covariance matrix and the second function comprises the Frobenius norm of the at least one of the diagonal matrix elements of the transformed covariance matrix.

11. The method of claim 1,
wherein a scaling factor is used in the comparison between the value of the first function and the value of the second function.

12. The method of claim 1,
wherein the determining as to whether a received signal includes an information signal based on a comparison of a value of the first function and a value of the second function, further comprises:
in case the value of the first function is greater than the value of the second function multiplied by the scaling factor, then classifying that the received signal includes an information signal; and
in case the value of the first function is less than or equal to the value of the second function multiplied by the scaling factor, then classifying that the received signal does not include an information signal.

13. The method of claim 1,
wherein the transformed covariance matrix is a diagonal matrix in case the received signal does not include the information signal.

14. A determining unit for determining as to whether a received signal includes an information signal, comprising:
a first determining unit configured to determine a covariance matrix from a received signal;
a transform unit configured to transform the covariance matrix into a transformed covariance matrix, wherein the transformation is configured such that the transformed covariance matrix is a non-diagonal matrix in case the received signal includes the information signal, wherein the non-diagonal matrix comprises non-zero non-diagonal matrix elements;
a second determining unit configured to determine a first function using at least one of the non-zero non-diagonal matrix elements of the transformed covariance matrix;
a third determining unit configured to determine a second function using at least one matrix element of the transformed covariance matrix, wherein the second function is different from the first function; and
a fourth determining unit configured to determine as to whether a received signal includes an information signal based on a comparison of a value of the first function and a value of the second function.

15. The determining unit of claim 14, further comprising:
a filter for filtering the received signal.

16. The determining unit of claim 14, further comprising:
a sampling unit for sampling the received signal.

17. The determining unit of claim 16, further comprising:
a filter for filtering the sampled received signal.

18. The determining unit of claim 14,
wherein the second function is determined using at least one of the diagonal matrix elements of the transformed covariance matrix.

19. The determining unit of claim 18,
wherein the first function comprises the absolute value of the at least one of the non-zero non-diagonal matrix elements of the transformed covariance matrix and the second function comprises the absolute value of the at least one of the diagonal matrix elements of the transformed covariance matrix.

20. The determining unit of claim 18,
wherein the first function comprises the Frobenius norm of the at least one of the non-zero non-diagonal matrix elements of the transformed covariance matrix and the second function comprises the Frobenius norm of the at least one of the diagonal matrix elements of the transformed covariance matrix.

21. The determining unit of claim 14,
wherein the fourth determining circuit is configured to use a scaling factor in the comparison between the value of the first function and the value of the second function.

22. The determining unit of claim 14,
wherein the transformed covariance matrix is a diagonal matrix in case the received signal does not include the information signal.

23. An electronic device comprising the determining unit of claim 14.

24. The electronic device of claim 23,
wherein the electronic device is a sensing wireless device.

25. The electronic device of claim 24,
wherein the electronic device is a sensing wireless microphone.

26. The electronic device of claim 25,
being configured as an electronic device selected from a group of electronic devices consisting of:
a communication terminal;
a medium player device configured to play at least one medium.

27. The electronic device of claim 25, further comprising:
a receiver to receive a signal.

28. A computer program product which, when being executed by a computer, makes the computer perform a method for determining as to whether a received signal includes an information signal comprising:
determining a covariance matrix from a received signal;
transforming the covariance matrix into a transformed covariance matrix, wherein the transformation is configured such that the transformed covariance matrix is a non-diagonal matrix in case the received signal includes the information signal, wherein the non-diagonal matrix comprises non-zero non-diagonal matrix elements;

determining a first function using at least one of the non-zero non-diagonal matrix elements of the transformed covariance matrix;

determining a second function using at least one matrix element of the transformed covariance matrix, wherein the second function is different from the first function; and determining as to whether a received signal includes an information signal based on a comparison of a value of the first function and a value of the second function.

* * * * *